United States Patent
Schnitzlein

(10) Patent No.: US 8,004,725 B2
(45) Date of Patent: Aug. 23, 2011

(54) DEVICE AND METHOD FOR SCANNING A DOCUMENT

(75) Inventor: Markus Schnitzlein, Radolfzell (DE)

(73) Assignee: Chromasens GmbH (DE)

(*) Notice: Subject to any disclaimer, the term of this patent is extended or adjusted under 35 U.S.C. 154(b) by 1195 days.

(21) Appl. No.: 10/515,360

(22) PCT Filed: May 7, 2003

(86) PCT No.: PCT/EP03/04787
§ 371 (c)(1),
(2), (4) Date: Sep. 1, 2005

(87) PCT Pub. No.: WO03/098917
PCT Pub. Date: Nov. 27, 2003

(65) Prior Publication Data
US 2006/0109524 A1    May 25, 2006

(30) Foreign Application Priority Data
May 22, 2002 (DE) .................... 102 22 685

(51) Int. Cl.
*G06K 15/12* (2006.01)

(52) U.S. Cl. ........ 358/474; 358/477; 358/505; 396/448; 396/505; 250/208.1; 250/208.2; 250/208.3; 250/208.4

(58) Field of Classification Search .......... 358/482–483, 358/474–475, 477, 512–514, 505, 509; 382/298; 396/449–452, 505, 448, 458–459, 460–462; 250/208.1–208.4
See application file for complete search history.

(56) References Cited

U.S. PATENT DOCUMENTS

| | | | |
|---|---|---|---|
| 4,321,628 A * | 3/1982 | Crean | 358/497 |
| 4,567,527 A | 1/1986 | Yokomizo | |
| 4,922,087 A * | 5/1990 | Nakajima et al. | 250/201.4 |
| 5,202,556 A | 4/1993 | Kawabata et al. | |
| 5,333,066 A * | 7/1994 | Sugata | 358/471 |
| 6,215,563 B1 | 4/2001 | Onishi et al. | |
| 6,219,463 B1 * | 4/2001 | Hyodo | 382/298 |
| 6,504,904 B2 * | 1/2003 | Danielsson | 378/149 |
| 6,704,461 B1 * | 3/2004 | Yamamoto | 382/298 |
| 7,173,743 B2 * | 2/2007 | Yamazaki | 358/483 |

FOREIGN PATENT DOCUMENTS

| | | |
|---|---|---|
| DE | 30 39 139 A1 | 4/1981 |
| DE | 41 43 483 C2 | 9/1991 |
| EP | 1 126 692 A2 | 8/2001 |
| JP | 5-68140 A | 3/1993 |
| JP | 7-30729 A | 1/1995 |
| JP | 7-135556 A | 5/1995 |
| JP | 2000-354158 | 12/2000 |
| WO | WO 03/098917 | 11/2003 |

* cited by examiner

Primary Examiner — Chan S Park
Assistant Examiner — Jacky X Zheng
(74) Attorney, Agent, or Firm — Schiff Hardin LLP

(57) ABSTRACT

A device for scanning a document is provided. A document placed on a support surface is scanned line by line by a camera that is provided with an optoelectronic line sensor, and electric signals are produced. The line sensor includes a plurality of image recording elements disposed in a linear orientation. A lens system is used to image the light reflected by the document to be captured onto a part of the image recording elements.

7 Claims, 2 Drawing Sheets

DEVICE AND METHOD FOR SCANNING A DOCUMENT

BACKGROUND OF THE INVENTION

1. Field of the Invention

The present invention relates generally to a camera provided with a photoelectronic line sensor scans a document lying on a support surface line-by-line and generates electrical signals. The line sensor comprises a plurality of image detection elements arranged in a line.

2. Description of the Related Art

In known devices to scan a document, light-sensitive cells are linearly arranged in a line in order to determine (with the aid of an electrical signal) the intensity of the light impinging on these light-sensitive cells. Such light-sensitive cells can, for example, be CCD sensors (charge coupled device) that are fashioned as one- or two-dimensional CCD sensor arrangements. At least the line of the document to be scanned is illuminated with the aid of a light source. The light reflected by the document is supplied to the image detection elements of the CCD line sensor. The image detection elements generate an electrical charge corresponding to the supplied light.

After the detection of one line, the charge quantity of each image element is determined, in that the stored charge is, for example, supplied to an analog-digital converter. Either the document and/or the scanning device is subsequently shifted such that the next line can be scanned. Such devices for scanning a document are also designated as scanners that can, for example, be executed as flatbed scanners, hand scanners or drum scanners. In such known scanning devices, a document is illuminated in lines, whereby a camera records graphical elements of the document line-by-line and subsequently generates image data that are subsequently further processed. The width of the support surface and the number of the linearly arranged image detection elements define the resolution with which the image elements of the line of the document to be scanned are recorded.

Depending on the document to be recorded, different requirements are placed on the resolution with which the document should be recorded. It is thus frequently necessary that photos must be recorded with an optimally high resolution, however text can be recorded with a lower resolution. Thus in the prior art it is known to scan only every second possible line of the document. The scanning speed of the document can thereby be nearly doubled. Depending on the application field, the requirements for the image quality and the scanning speed can vary quite significantly. Thus in general a high scanning capacity at lower image quality, i.e. at lower resolution, is opposite to a lower scanning speed with higher image quality. Known devices to scan a document can react to these different requirements only in a limited manner. An adaptation to the different requirements can, for example, ensue via the exchange of the optoelectric line sensor and the associated optics. However, this exchange is connected with a large technical and financial expenditure.

An image reader in which an image to be recorded is recorded with the aid of a CCD image sensor is known from German Patent Document DE 30 39 139 A1. The light reflected by the document is deflected to the image sensor with the aid of a mirror. The deflected light is focused on the image sensor with the aid of an objective.

From German Patent Document DE 41 43 483 C2, a document reader is known that scans a document over a predetermined scan width along a primary scanning direction with the aid of a light beam. The light reflected by the document is detected with a photoconductive device. The reflected light is imaged with the aid of an objective on the photoconductive device.

From the Japanese Patent Document JP 7-30729 A it is known to image the light reflected by a document on two sensor elements with the aid of a lens and multiple reflection elements. The sensor elements respectively have a different pixel count per length unit with which they detect the light reflected by the document.

From the Japanese Patent Document JP 7-135556, it is known that the signals of multiple sensor elements of a sensor line are averaged to record the light reflected by a document corresponding to a target resolution that is less than the physical resolution of the sensor element.

From the Japanese Patent Document JP 5-68140 A, a line sensor is also known that can be read out twice as fast with halved resolution. A mechanical movement of the optics that image the light reflected by the document onto the sensor element is not necessary.

From the Japanese Patent Document JP 2000-354158 A, an adjustable optic is known via which documents with different width or with different resolution should be scanned, imaging the light reflected by the document onto the line sensor in a suitable manner. The respective width of the document is then imaged onto the available width of the sensor with the aid of the adjustable optic.

Further image generation devices are known from the documents U.S. Pat. No. 6,219,463 B1, European Patent Document EP 1 126 692 A and U.S. Pat. No. 6,215,563.

SUMMARY OF THE INVENTION

It is an object of the invention to provide a simple device and a simple method to scan a document in which, given a reduction of the resolution with which the document is scanned, a corresponding increase of the scanning speed is simply achieved.

According to the invention, a device to scan a document includes a camera provided with an optoelectronic line sensor, the camera scanning a document lying on a support surface line for line and generating electrical signals, whereby the line sensor comprises a plurality of linearly arranged image detection elements, and a lens arrangement that, in a first position, images light reflected by the line of the document to be recorded onto essentially all image detection elements of the line sensor, and that in at least one second position the lens arrangement images the light reflected by a document line onto a portion of the image detection elements of the line sensor.

For better understanding of the present invention, in the following reference is made to the preferred exemplary embodiment shown in the drawings, which is described using specific terminology. However, it is to be noted that the protective scope of the invention should not thereby be limited, since such variations and modifications to the shown device and the specified method as well as such further applications of the invention as it is shown therein are viewed as typical present or future expertise of a competent average man skilled in the art.

DETAILED DESCRIPTION OF THE PREFERRED EMBODIMENTS

In the inventive device, a lens arrangement is provided that images the light reflected by the line of the document to be recorded onto a portion of the image detection elements. This is in particular advantageous when the document should be recorded with a lower resolution than the maximum resolution possible with this device. The line of the document to be recorded can thereby be scanned by the line sensor with a correspondingly higher speed than given recording of the line at a higher resolution.

The lens arrangement images the same line on only one portion of the image detection elements of the line sensor, whereby only the electrical signals generated by this portion of the image detection elements are read out from the line sensor and further processed. In particular given a linear readout of the electrical signals of the line sensor, only the electrical signals of the image detection elements arranged in a row on which the lines of the document have been imaged must then be read out. In contrast to the prior art, the electrical signals of all image detection elements (of which only a part is subsequently further processed) thus no longer have to be read out; rather, only the electrical signals of the image detection elements on which the line of the document has been imaged are read out.

Due to the imaging of the line of the document on only one portion of the image detection elements, the scanning of the line of the document ensues with a reduced resolution. Via this device to scan a document, it is possible that, given scanning of the document, the number of the recorded image elements is (even at a lower resolution) approximately equal to the number of the recorded image elements given recording of a document with a high resolution. The scanning speed of the device can thereby be increased with little effort.

According to a second aspect, the invention concerns a method to scan a document. With the aid of a lens arrangement, the light reflected by the line of the document to be recorded is imaged onto a portion of the image detection elements. Only the electrical signals of the image detection elements on which the reflected light is imaged are further processed. It is thereby achieved that a document is scanned at a higher speed at a reduced resolution.

Figure 1:
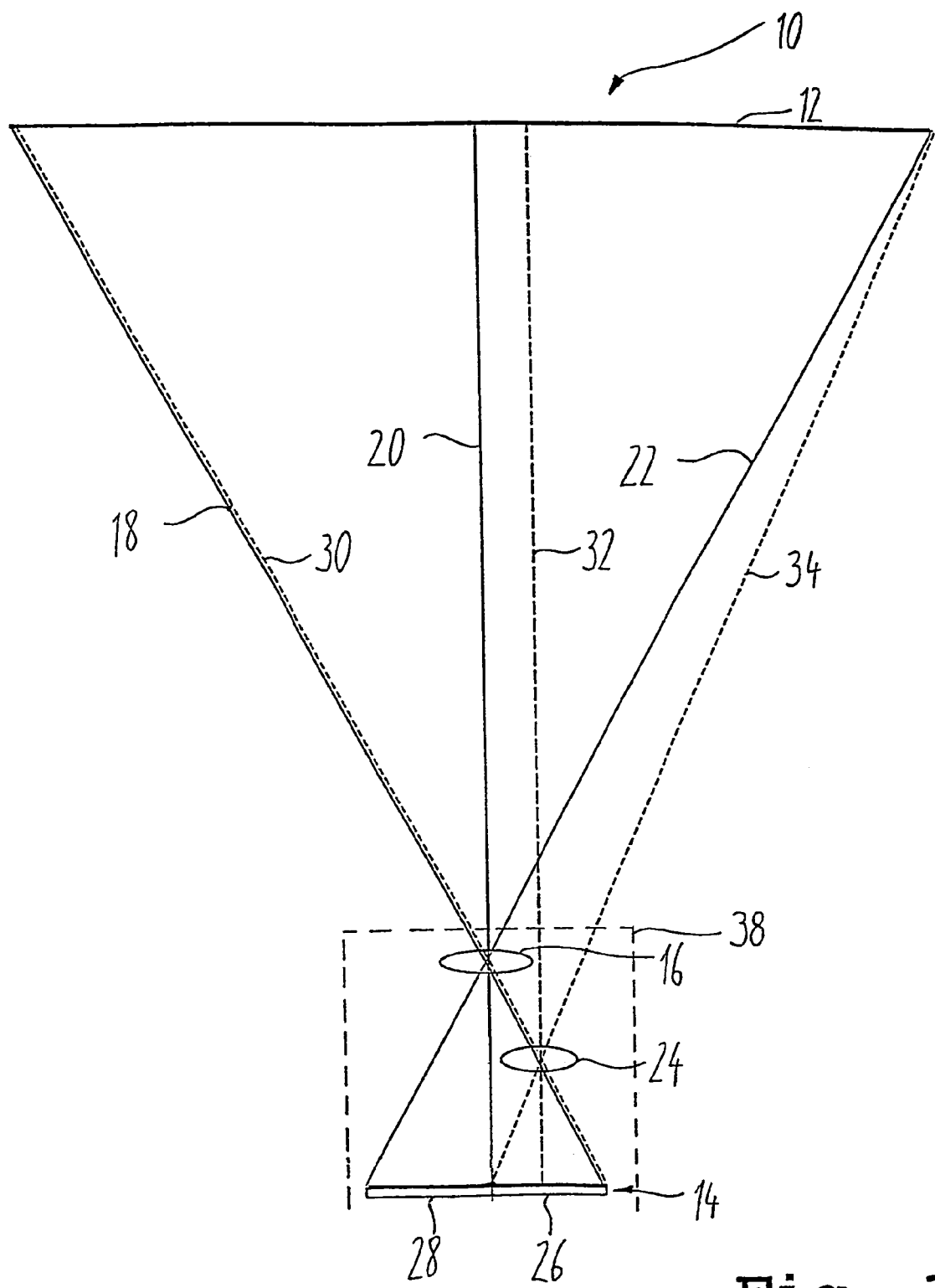
FIG. 1 is a schematic representation of a scanning device to scan a document.

With reference to the drawings, a scanning device 10 to scan a document 12 is schematically shown in FIG. 1. In the device 10 shown in FIG. 1, a document 12 to be scanned is arranged opposite a line sensor 14 with image detection elements. The line sensor 14 comprises CCD image detection elements (charge coupled device) that are linearly arranged in a line. The document 12 is scanned line-by-line by the line sensor 14, in that the document 12 and/or the line sensor 14 are displaced line-by-line opposite to one another. The line of the document 12 to be recorded is illuminated with the aid of a light source (not shown), whereby the light reflected by the document 12 is imaged onto the image detection elements of the line sensor 14 via an optical system, for example via a lens 16. The beam path for the imaging of the line reflected by the document 12 onto the line sensor 14 is indicated by the rays 18, 20, and 22, whereby the ray 20 forms the optical axis of the lens 16. The image detection elements of the line sensor 14 are arranged in a number and at a separation such that the lines of the document 12 imaged on the line sensor 14 are recorded with a resolution of 400 pixels per inch (dpi), i.e. with 400 pixels per 2.54 cm. Other scanning resolutions are of course possible. The line sensor 14 and the lens 16 form a camera 38 for line-by-line scanning of the document 12.

Should the document 12 be recorded with only a resolution of 200 dpi instead of 400 dpi, for example to reduce the amount of data, in known devices 10 to scan a document 12 the line of the document 12 to be recorded is imaged onto the line sensor 14 with the aid of the lens 16, and the signals of the line sensor 14 generated from the image detection elements are read out, whereby only the electrical signals of every second image detection element are further processed. Given relatively cost-effective CCD sensors, it is necessary that the electrical signals of the image detection elements are read out in series, since a direct addressing of individual image detection elements (i.e. the specific readout of individual image detection elements) is not possible. Thus, even given a reduction of the resolution, no faster scanning of a line is possible to record the electrical signals of the line to be scanned. An accelerated recording of the document 12 to be scanned in known scanners 10 only results in that (for example given a halving of the resolution) only every second line of the document 12 has to be recorded.

In the inventive scanning device 10, should the line of the document 12 be recorded with a lower resolution, the lens 16 is exchanged with a lens 24 that images the light reflected by the document 12 onto only one region 26 of the line sensor 14, i.e. only onto one portion of the image detection elements of the line sensor 14. Given a reduction of the resolution from 400 dpi to 200 dpi, the lens 24 images the light reflected by the line of the document 12 to be recorded onto the region 26 of the line sensor 14, which essentially comprises half of the image detection elements that are used to record the same line of the document 12 with a resolution of 400 dpi. The electrical signals of the image detection elements of the region 26 are read out in series from the line sensor 14 for further processing, whereby the electrical signals of the image detection elements that are contained in the region designated with the reference character 28 are not read out.

Even given CCD sensors to be read out linearly, it is simply possible to read out electrical signals of image detection elements arranged next to one another of a region 26 of the CCD line sensor 14. Upon scanning of the line of the document 12, the image detection elements of the region 28 of the line sensor 14 are not read out or, respectively, are no longer read out. The beam path to image the line of the document 12 to be scanned onto the region 26 of the line sensor 14 via the lens 24 is clarified by the rays 30, 32, and 34 shown with dashed lines, whereby the ray 34 forms the optical axis of the lens 24. Given a reduction of the resolution from 400 dpi to 200 dpi, i.e. given a halving of the resolution, the optical axis 32 of the lens 24 is shifted by approximately ¼ of the width of the line sensor 14 to the optical axis 20 of the lens 16, in order to image the line of the document 12 to be recorded on the right region 26 of the line sensor 14. The region 26 of the line sensor 14 begins at the outer edge of the line sensor 14, whereby the electrical signals of the image detection elements of the region 26 can be simple recorded via readout of the first right half of the image detection elements of the line sensor 14.

Figure 2:
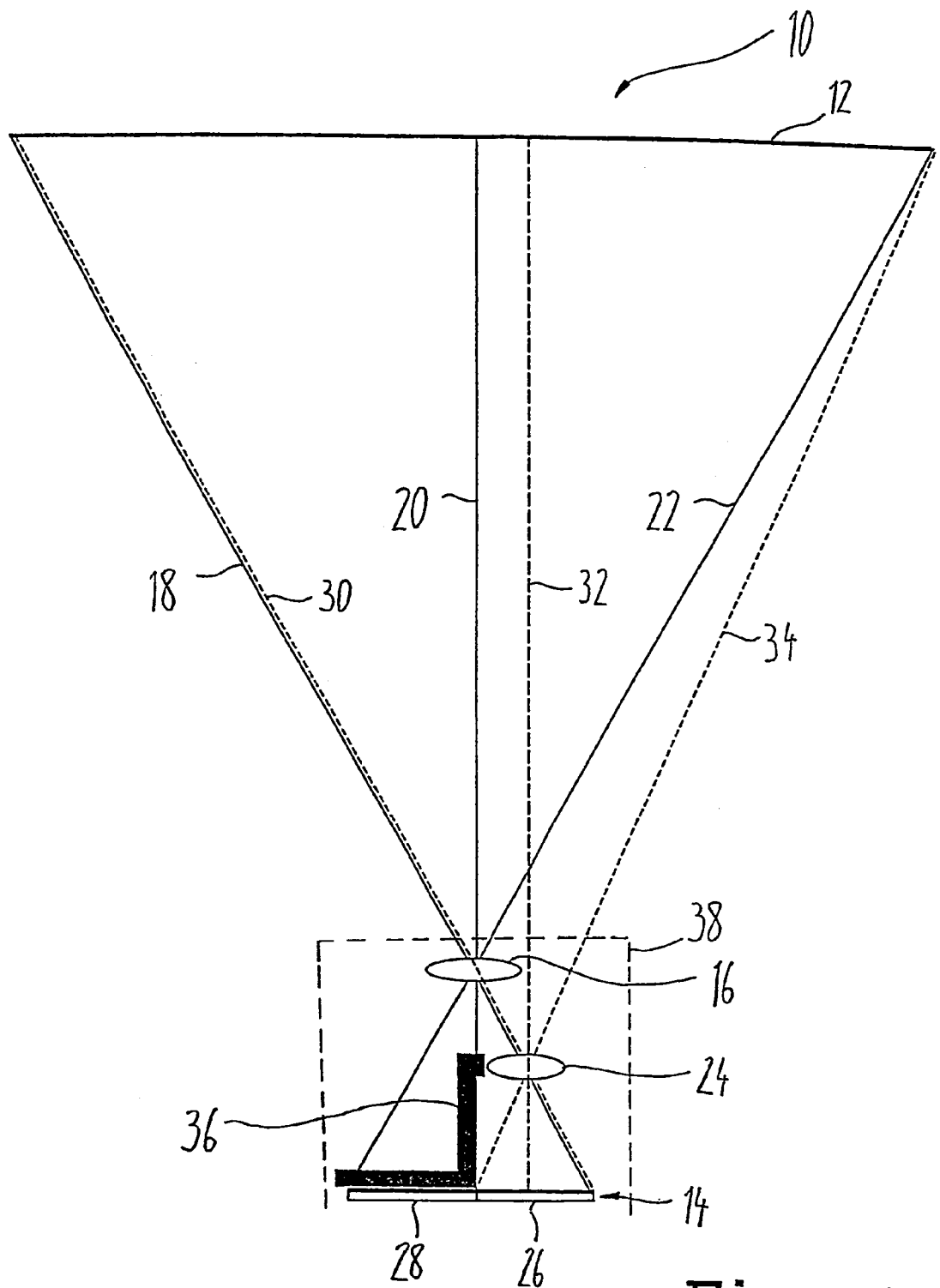
FIG. 2 is a schematic representation of a scanning device according to FIG. 1, whereby a region of an image detection element is covered with the aid of a diaphragm.

The scanning device 10 according to FIG. 1 is shown in FIG. 2, whereby the image elements of the region 28 of the line sensor 14 are covered with the aid of a diaphragm 36, such that no light can impinge on the image elements of the region 28. If the line of the document 12 to be recorded is imaged onto the region 26 of the line sensor 14 with the aid of the lens 24, via the diaphragm 36 it is achieved that no light, in particular no scatter light, is detected by the image elements of the region 28. Upon readout of the electrical signals of the image elements of the line sensor 14, given relatively cost-effective CCD line sensors 14 only the electrical signal of the first image element, of the line sensor 14 is always read out. After the readout of the electrical signal, the charges of the image detection elements following to the left are shifted to the right like a type of shift register, such that via the light impinging on the image detection elements, the electrical charge generated in the respective image detection element is shifted in succession into the storage of the image element arranged farthest to the right and is read out from the right most image element. Via the shifting of the charge, image elements without charge are generated beginning with the outermost left image element.

The diaphragm 36 prevents the generation of an electrical charge (for example via scatter light) by the image element of the region 28 of the line sensor 14 upon recording of the line of the document 12 to be scanned. No charges which could falsify subsequent measurement results are thereby subsequently shifted into the storage of the image detection elements of the region 26 upon readout of the electrical signals of the image detection elements of the region 28. After the readout of the electrical signals of the image detection elements of the region 26, the charges stored in the image detection elements of the region 28 have been shifted into the image detection elements of the region 26. However, no electrical charges are generated by the image detection elements of the region 28. The image detection elements of the region 26 are thus already charge-free after the readout of the image elements of the region 26, since no electrical charges that could be shifted from the region 28 into the region 26 are generated due to the diaphragm 36 in the region 38.

It is not mandatory, for example, to provide the diaphragm 36 in embodiments in which the charge of the image elements of the CCD line sensor 14 is removed in another manner and/or the charges of the image elements of the region 28 are not shifted into the image elements of the region 26. In the exemplary embodiment according to FIGS. 1 and 2, depending on the desired resolution either the lens 16 or the lens 24 is arranged between the document 12 and the line sensor. In other embodiments of the invention, however, the position of the lens 16 or the lens 24 can also be changed such that only one part of the line of the document 12 to be recorded is imaged on the region 26 of the line sensor 14 with the aid of the lens 16.

Instead of the lens 16, 24, however, in further embodiments it is also possible to provide a zoom lens system whose optical axes 20, 32 can be displaced relative to the line sensor 14. However, it is also possible to displace the position of the line sensor 14 such that the line of the document 12 to be scanned is imaged in a first position onto the region 26 of the line sensor 14, whereby a resolution of 200 dpi results, and in a second position the line is imaged onto the regions 28 and 26 of the line sensor 14, whereby the line is recorded with a resolution of 400 dpi. The electrical charge signals recorded and read out from the line sensor 14 can subsequently be supplied to an analog-digital converter that converts the electrical charge signals of the image detection elements into digital signals.

If the scanning device 10 according to FIG. 1 or 2 has a line sensor 14 that records a document line of 300 mm width with 400 dpi, i.e. in that approximately 5000 image detection elements are arranged linearly next to one another to record the document line, approximately 4000 lines are scanned per second by the device 10 when the line sensor 14 has a processing speed of 20 million pixel signals per second. At a resolution of 400 dpi, a scanning speed of 25.4 mm per second results.

Should the same document 12 be scanned with only a resolution of 200 dpi, only every second line of the document 12 is scanned. The resolution of 200 dpi between the lines, which is also designated as a transport resolution, is achieved via a corresponding advance of the line sensor 14 and/or the document 12. The scanning speed given 4000 recorded lines per second can thereby be doubled to approximately 50.8 mm per second.

If the light reflected by the line of the document 12 to be recorded is also mapped to only the half (i.e. the region 26) of the line sensor 14, as already specified in connection with FIGS. 1 and 2, the image elements of the line can thereby also be recorded with a resolution of only 200 dpi, whereby a line with 300 mm document width is recorded with 2500 image detection elements and 8000 lines of the document 12 are scanned by the device 10 per second. The processing speed is thereby increased to 101.6 mm per second.

If a document 12 to be scanned with a resolution of 200 dpi has, for example, only a width of 210 mm, only 1750 image elements or, respectively, pixels are necessary to scan one line. Given a processing speed of the line sensor 14 of 20 million pixels per second, thus 11428 lines can be scanned per second, whereby a scan speed of 145.1 mm per second is achieved at a scanning resolution of 200 dpi.

Although a preferred exemplary embodiment is displayed and described in detail in the drawings and in the preceding specification, this should be viewed as purely exemplary and not as limiting the invention. It is to be noted that only the preferred exemplary embodiment is shown and described, and all variations and modifications that presently and in the future line within the protective scope of the invention should be protected.

Although other modifications and changes may be suggested by those skilled in the art, it is the intention of the inventors to embody within the patent warranted hereon all changes and modifications as reasonably and properly come within the scope of their contribution to the art.

The invention claimed is:

1. A device to scan a document, comprising:
   a support surface for supporting a document to be scanned;
   a camera having an optoelectronic line sensor, said line sensor being disposed to perform line by line scanning of the document on said support surface, said line sensor generating electrical signals by said scanning of the document, said line sensor including a plurality of linearly arranged image detection elements;
   a lens arrangement for imaging light reflected by a document line onto a portion of said image detection elements of said line sensor; and
   a diaphragm lying directly above, close to, and covering the image detection elements lying outside of said portion so that no electrical charges caused by said reflected imaging light and scatter light from said reflected imaging light are generated in the image detection elements covered by said diaphragm, said diaphragm leaving said portion of said image sensor elements exposed for receiving said reflected imaging light.

2. The device to scan a document as claimed in claim 1, wherein said image detection elements are CCD sensor elements.

3. The device according to claim 2, wherein said diaphragm leaving said portion of said image sensor elements exposed.

4. A device to scan a document, comprising:
   a support surface for supporting a document to be scanned;
   a camera having an optoelectronic line sensor, said line sensor being disposed to perform line by line scanning of the document on said support surface, said line sensor generating electrical signals by said scanning of the document, said line sensor including a plurality of linearly arranged image detection elements;

a lens arrangement for imaging light reflected by a document line onto a portion of said image detection elements of said line sensor; and a diaphragm lying directly above, close to, and covering a region of said line sensor comprising image sensor elements which are not to be read out lying outside of said portion so that no electrical charges caused by said reflected imaging light and scatter light from said reflected imaging light are generated in the image detection elements covered by said diaphragm.

5. The device to scan a document as claimed in claim 4, wherein said image detection elements are CCD sensor elements.

6. An optical scanning device for scanning a document, comprising:

a document station support constructed and configured to support a document to be scanned;

an arrangement of image sensor elements disposed to detect light reflected from the document and operable to generate electrical signals corresponding to the light from the document; and a lens system, said lens system being operable to focus light reflected from the document onto a portion of said arrangement of image sensor elements, and a diaphragm lying directly above, close to, and covering operable to cover image sensor elements outside of said portion of said image sensor elements which are exposed so that no electrical charges caused by said reflected imaging light and scattered light of said reflected imaging light are generated in the image detection elements covered by said diaphragm.

7. The optical scanning device as claimed in claim 6, wherein said arrangement of image sensor elements is an arrangement of CCD sensor elements.

* * * * *